Aug. 29, 1933.  H. LEBEN ET AL  1,924,247
ELECTRIC PROTECTIVE SYSTEM AND RELAY FOR USE THEREIN
Filed June 17, 1929   3 Sheets-Sheet 3
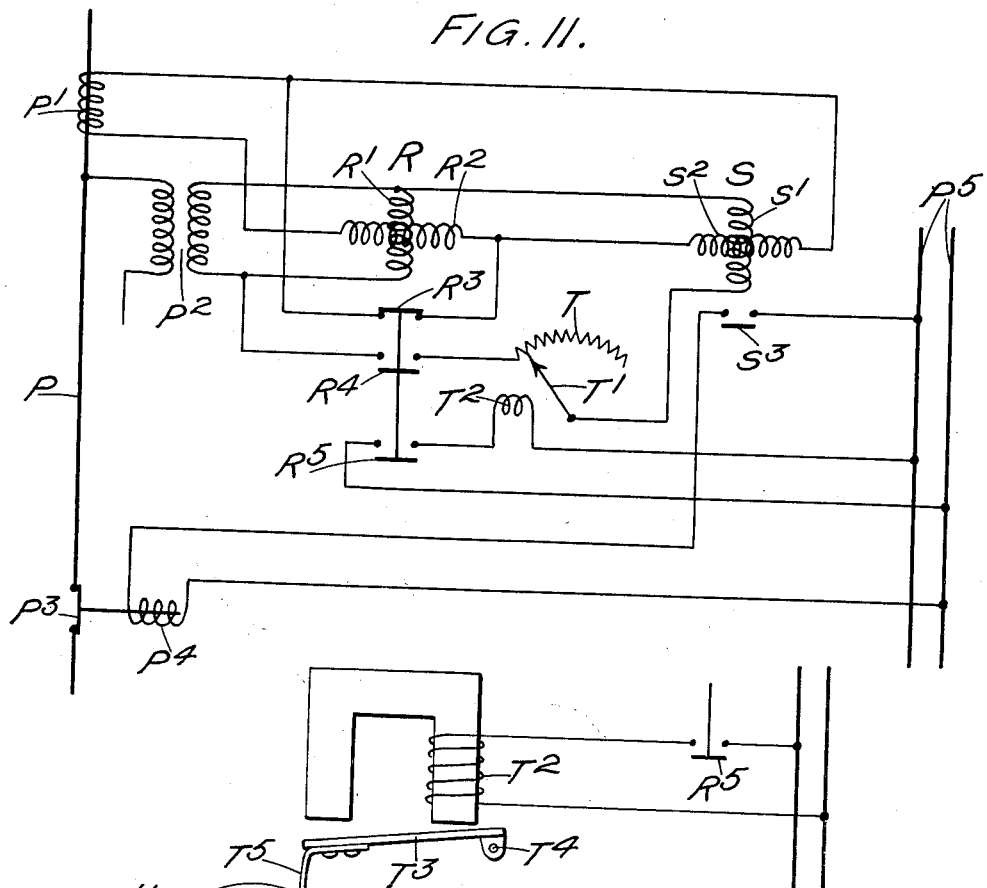
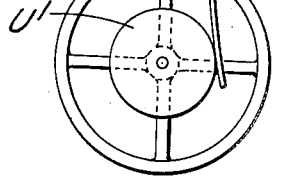
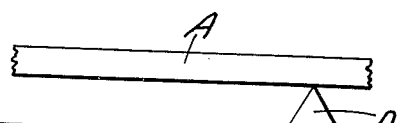
INVENTORS
Henry Leben &
Norman Cooke
Per,
Watson, Cait, Morse + Grindle
Atty.

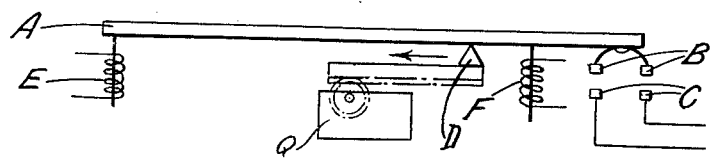
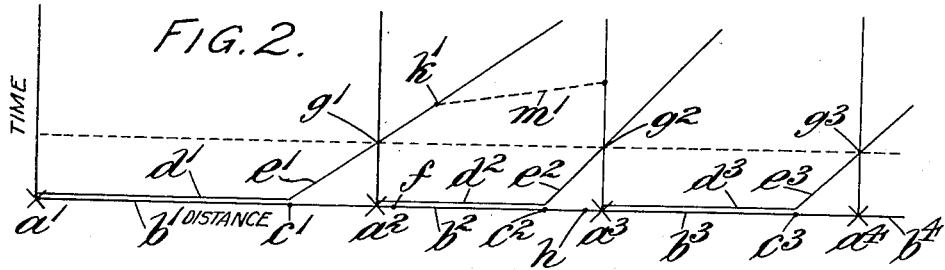
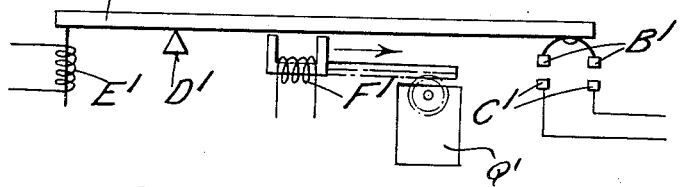
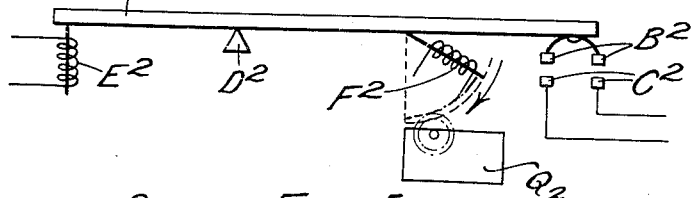
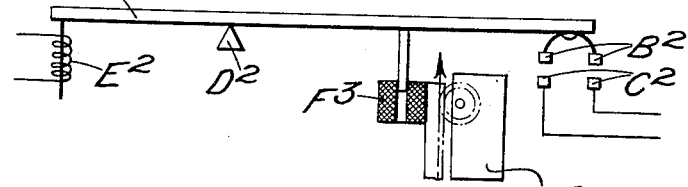
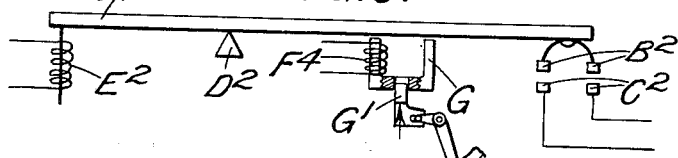

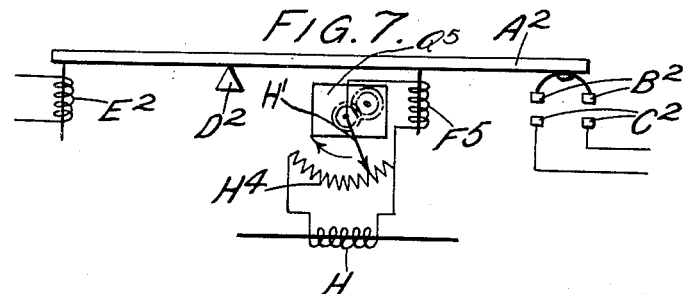
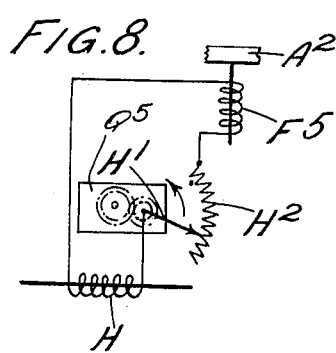
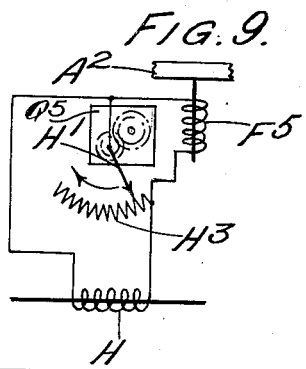
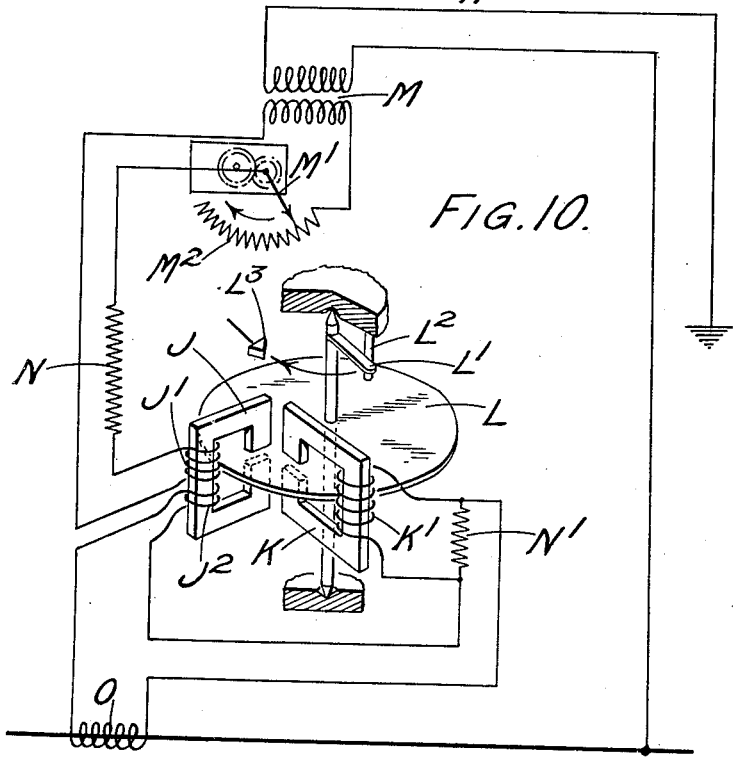

Patented Aug. 29, 1933

1,924,247

UNITED STATES PATENT OFFICE 1,924,247

ELECTRIC PROTECTIVE SYSTEM AND RELAY FOR USE THEREIN

Henry Leben, Newcastle-upon-Tyne, and Norman Cooke, Sunderland, England, assignors to A. Reyrolle & Company Limited, Hebburn-on-Tyne, England, a Company of Great Britain Application June 17, 1929, Serial No. 371,484, and in Great Britain June 25, 1928

22 Claims. (Cl. 175—294)

This invention relates to electric protective systems of the kind generally known as impedance protective systems and to relays for use therein. Such systems depend for their operation on the fact that the impedance or reactance or resistance of the portion of the protected line between the fault and the relay is proportional to the distance of the fault from the relay. Thus in known impedance systems a number of protective relays are disposed at the ends of sections of the protected line, such relays being employed to give discriminative protection for the sections of the line by so arranging them that the time of operation of each relay is proportional to the impedance ratio of the line.

In view of the fact that a small but definite time necessarily elapses after the operation of a relay before the circuit-breaker in the line actually opens, it is desirable in such systems, in order to ensure satisfactory discrimination, to adjust the speed of the timing mechanism of each relay to suit the length of the section protected, so that the maximum time taken to clear a fault is the same on all sections, i.e., so that the time of operation of a relay for a fault at the remote end of its section is the same for all sections irrespective of the length of the section. With such an arrangement incorrect operation may, however, occur when a long section is immediately followed by a very short section. Thus if a fault occurs on the short section near the end remote from the long section and is fed from the long section, the relay at the beginning of the long section may operate before the relay at the beginning of the short section has had time to clear the fault, the healthy long section thus being cut out as well as the faulty short section. This difficulty can be overcome by increasing the maximum time setting on the long section, but such an increase is clearly undesirable if it can be avoided.

The primary object of the present invention is so to arrange an impedance or like protective system that satisfactory discriminative protection can be obtained on a sectionalized line without increasing the maximum time setting on any section.

Another object of the invention is to provide a convenient practical construction of relay for use in such a system.

Further objects of the invention will be apparent from the appended claims and from the following description of the accompanying drawings which illustrate by way of example some convenient practical arrangements according to the invention. In these drawings, Figure 1 shows one simple form of relay, Figure 2 is a time-distance diagram, Figures 3–10 illustrate alternative constructions of relay, Figure 11 shows a simplified circuit diagram of a protective system employing the relay construction of Figure 10, Figure 12 illustrates apparatus forming part of the system shown in Figure 11, and Figure 13 shows a modification of the relay construction of Figure 1.

In the simple arrangement shown in Figure 1 the relay contact member is in the form of a beam A which carries contacts B cooperating with fixed contacts C and is so mounted that it can be rocked about a movable fulcrum D. On one side of the fulcrum D the beam carries the armature of an electromagnet E which is energized, say, in accordance with the voltage in the protected section. On the other side of the fulcrum the beam is similarly provided with the armature of another electromagnet F energized in accordance with the current in the protected section. The fulcrum D is movable along the beam A between the two coils E, F and is driven in a direction away from the current coil F towards the voltage coil E by clockwork or other constant speed mechanism indicated at Q. Thus if in the normal rest position of the fulcrum D the moment of the force due to the voltage coil E is greater than that due to the current coil F, the contacts B, C will be held open, but as the fulcrum D is moved the moments of the two forces become more nearly equal and finally the contacts will close after a time interval dependent on the ratio of the two operating currents. The normal rest position of the fulcrum D corresponds to a definite value of the ratio between the two operating currents, and consequently if, when the relay coils E, F are energized, the ratio is below this critical value the relay will operate instantaneously. As will be explained more fully later, the coils E, F may be energized otherwise than directly in accordance with the voltage and the current in the protected line, provided that the ratio of the two operating currents is representative of the distance of the fault from the relay.

In practice a number of such relays would be disposed respectively at the ends of sections of the line to be protected, each relay affording protection for its own section. The arrangement will be clear from the diagram of Figure 2, which shows time-distance curves for relays located respectively at the ends $a^1$, $a^2$, $a^3$, $a^4$ . . . of sections $b^1$, $b^2$, $b^3$, $b^4$ . . . of the protected line. The normal rest position of the fulcrum D of each relay is chosen to correspond to a fault position at $c^1$, $c^2$, $c^3$ . . . at, say, three-quarters of the length of the section from the relay. Thus for faults occurring on the first three-quarters of the section between $a^1$ and $c^1$, $a^2$ and $c^2$, $a^3$ and $c^3$ . . ., the corresponding relay will operate substantially instantaneously as indicated by the portions $d^1$, $d^2$, $d^3$ . . . of the time-distance curves, whilst for faults in the last quarter of the section and beyond the end of the section the time of operation of the relay will depend on the position of the fault as indicated by the portions $e^1$, $e^2$, $e^3$ . . . of the curves.

It will be appreciated that for a fault at $f$ just beyond the end of a section $b^1$, the relay at $a^2$ associated with the faulty section $b^2$ will operate instantaneously and will trip its circuit-breaker. Since however a small but definite time will elapse after the operation of the relay at $a^2$ before the circuit-breaker actually opens, it will be clear that the time of operation of the relay at $a^1$ on the healthy section $b^1$ must be long enough to ensure that the relay will not operate before the fault is cleared. Thus it is desirable to adjust each relay so that the time of operation for a fault at the remote end of its associated section is the same as that on all other sections, in other words that the points $g^1$, $g^2$, $g^3$ . . . where the curves $e^1$, $e^2$, $e^3$ . . . respectively cut the ordinates through the points $a^2$, $a^3$, $a^4$ . . . are at the same height. Thus the steepness of the slope of the portions $e^1$, $e^2$, $e^3$ . . . of the time-distance curves depends upon the lengths of the corresponding sections and the chosen percentages of the sections over which instantaneous operation is to take place. If the chosen percentage is the same on all sections, the slope of the curve will be steeper for shorter sections than for longer sections, but in some instances it may be preferable to vary the percentage in accordance with the length of the section so as to maintain the same slope on all sections, i. e. so that the distances from $c^1$ to $a^2$ from $c^2$ to $a^3$, from $c^3$ to $a^4$ . . . are all equal to one another.

It will be clear that the relatively steep slope of the curve at the end of a section, say $b^1$, may result in an unduly long operating time in the case of a fault at $h$ towards the remote end of the next section $b^2$, if for any reason the relay at $a^2$ associated with the section $b^2$ should fail to operate. This difficulty can be overcome, however, by so arranging the mechanism which drives the fulcrum D of the relay at $a^1$ that, when the fulcrum reaches a position corresponding to a fault position well beyond the end of the section $b^1$, the rate of movement of the fulcrum is considerably increased. Such an arrangement is illustrated in Figure 13 and will be described later with reference to that figure. With this arrangement the steep portion $e^1$ of the curve will continue to a point $k^1$ at, say, a quarter of the length of the section $b^2$, and the curve will thereafter have only a slight slope (as indicated by the dotted line $m^1$) up to its termination, which may conveniently occur on the ordinate at $a^3$ since it is generally unnecessary to provide against the failure of more than one relay.

The construction of Figure 1 may be modified as shown in Figure 3, by keeping the fulcrum $D^1$ of the beam $A^1$ fixed in position and by so arranging the timing mechanism $Q^1$ that it will drive one of the coils $E^1$, $F^1$ along the beam $A^1$ which is constructed of magnetic material. In the example illustrated the current coil $F^1$ is shown as the movable coil and is driven away from the fulcrum $D^1$ from an initial position corresponding to the chosen point $c^1$ of Figure 2, so that the contacts $B^1$, $C^1$ are operated instantaneously for faults between $a^1$ and $c^1$ and after the appropriate time-lag for faults beyond $c^1$.

A further modification, which enables both the fulcrum and the points of application of the two forces to remain fixed, is shown in Figure 4. In this case the desired variation in the moment of one of the forces about the fulcrum $D^2$ is obtained by causing the timing mechanism $Q^2$ to rotate one of the two coils $E^2$, $F^2$, say the current coil $F^2$, about the point of application of its force to the beam $A^2$. This varies the direction of application of the force so that its moment increases as the axis of the coil becomes more nearly at right angles to the beam. The coil $F^2$ is initially set at such an angle that the contacts $B^2$ $C^2$ close instantaneously if the ratio of the operating currents is less than a predetermined value.

In the foregoing arrangements the two forces are maintained directly proportional respectively to the voltage and the current, and the timing mechanism acts to vary the relative action of the two forces on the beam. In the arrangements of Figures 5—9 on the other hand, one of the two forces, say that due to the voltage coil, is maintained proportional to its operating current, whilst the magnitude of the other force is varied at a timed rate by the timing mechanism, its direction and point of application being maintained constant. In all these figures the arrangement of the beam $A^2$, the fulcrum $D^2$, the voltage coil $E^2$ and the contacts $B^2$, $C^2$ is similar to that of Figure 4, the same reference letters being employed.

In the arrangement of Figure 5 the current coil $F^3$ is driven by the timing mechanism $Q^3$ in a direction at right angles to the beam $A^2$ so that its force gradually increases as the beam is approached.

The same result may be obtained magnetically as in Figure 6 by arranging that the timing mechanism $Q^4$ drives a piece of magnetic material $G^1$ into an air-gap in the magnetic circuit G of the current coil $F^4$. Alternatively a piece of magnetic material may be driven away from the core so that it acts as a gradually decreasing magnetic shunt and thus allows the electromagnetic force on the beam to be gradually increased.

In another alternative arrangement, shown in three modifications respectively in Figures 7, 8 and 9, the desired variation in the force is obtained by electrical means. In this arrangement the current coil $F^5$ is fixed in position and the magnitude of the energizing current supplied to it from the current transformer H is varied at a definite timed rate by the timing mechanism $Q^5$. Thus this mechanism may act to drive a contact arm $H^1$ over a resistance $H^2$ or $H^3$ or $H^4$ so that the amount of resistance in series ($H^2$ in Figure 8) or in parallel ($H^3$ in Figure 9) or in series-parallel ($H^4$ in Figure 7) with the current coil $F^5$ is gradually varied. In such arrangements the contact member may be in the form of a pivoted beam as illustrated or any other form of mechanical contact-making system capable of operation under the differential action of the two forces may be employed.

In each of the above arrangements the member driven by the timing mechanism is initially set in a position corresponding to the furthermost point ($c^1$ in Figure 2) on the section at which instantaneous operation is desired.

In the foregoing arrangements the two operating currents have been described as proportional respectively to the voltage V and to the current I in the section, so that the time of operation of the relay is dependent on the impedance ratio V/I. With this ratio, however, incorrect timing is apt to occur owing to the influence of the fault arc which, as experiment has shown, has a variable resistance but a negligible reactance. In order to ensure that the time of operation of the relay is a function of the distance of the fault only, it is preferable to employ the reactance ratio $V \sin \phi / I$ (where $\phi$ is the phase angle) as the operating ratio of the relay. This ratio can be readily obtained in the above arrangements by so energizing the two coils that the two forces are proportional respectively to $V I \sin \phi$ and to $I^2$. Thus one coil would have the characteristics of an idle wattmeter, whilst the square law associated with the other coil can be obtained by not saturating the iron circuit or by means of a dynamometer element. In cases where accuracy of timing is not essential, the impedance ratio may be employed, or alternatively other ratios, such as the ratio $V/I \cos \phi$ which may be obtained by making the two forces proportional respectively to $V^2$ and to $V I \cos \phi$, or the resistance ratio $V \cos \phi / I$ which may be obtained by making the two forces proportional respectively to $V I \cos \phi$ and to $I^2$.

In other alternative arrangement (a convenient practical form of which is illustrated in Figure 10) the relay has a wattmertical movement, in which the contact member moves under the influence of a single torque due to the interaction of two or more magnetic fluxes derived from the two operating currents, one or more of such fluxes being varied by the timing mechanism relatively to the current or currents from which it is derived. Thus two magnetic core members J, K may be employed, one carrying two windings (a voltage winding $J^1$ and a current winding $J^2$) and the other a single current winding $K^1$, the movable contact member, which may consist of an induction disc L or like member passing between the poles of the fixed core members J, K, being operated by the interaction of the resultant flux in the first core member J with the flux in the second core member K. The energizing current supplied to the voltage winding $J^1$ from the potential transformer M in the protected circuit is varied at a definite timed rate (in a manner similar to that shown in Figure 8) by driving a contact arm $M^1$ across a resistance $M^2$ connected, say, in series with the circuit. Alternatively the voltage winding $J^1$ may be constantly energized and the variation introduced into the energizing circuit of the current windings $J^2$, $K^1$ from a current transformer O. Resistances or other suitable devices are introduced into the circuits to ensure the proper phase relationships between the currents supplied to the three windings. In the example illustrated a large swamping resistance N is connected in series with the voltage winding $J^1$ to ensure that the current in that winding is in phase with the applied voltage and that the flux due to the winding $J^1$ does not change in phase on alteration of the resistance $M^2$, and another resistance $N^1$ is connected across the current winding $K^2$ for phase-shifting purposes. In this way the relay characteristic is made to depend on the reactance ratio $V \sin \phi / I$, but other ratios may readily be obtained with other phase-shifting devices.

With this arrangement in the case of a distant fault the torque will first of all hold the disc L with its contact arm $L^1$ against a fixed stop $L^2$, but a gradual increase in the resistance $M^2$ will reduce the resultant flux in the core member J and consequently also the torque, until after the appropriate time-lag the torque will change from a restraining torque into an operating torque and the arm $L^1$ will move over into engagement with the fixed contact $L^3$. The resistance contact arm $M^1$ is initally set at a position corresponding to the furthermost point at which instantaneous operation is desired, and if a fault should occur within the instantaneous zone the torque will initially be an operating torque and the contact arm $L^1$ will move immediately into its operative position.

It will be appreciated that with any of the foregoing arrangements the relay is preferably normally disconnected, and is only brought into circuit by initiating elements operative when the voltage of the system drops to an abnormally low value or when the current therein rises to an excessive value or when the impedance or like ratio falls below a predetermined value. The manner in which the initiating elements control the relay may vary. Thus the windings of the relay may be permanently connected into circuit, the movable contact-member being held locked until released by the initiating elements, or the initiating elements may act to connect into circuit one or each of the normally disconnected windings. The initiating elements will also act to start up the timing mechanism. One such arrangement is illustrated diagrammatically in Figure 11 as applied to the relay shown in Figure 10.

In this arrangement, which for simplicity is shown as a single line diagram, the protected circuit P is provided with a current transformer $P^1$ and a potential transformer $P^2$ and is controlled by a circuit-breaker $P^3$ operated by a trip coil $P^4$ adapted to be energized from a d.c. control source $P^5$. An initiating relay R (which is preferably arranged in the manner more fully described in the present applicants' co-pending U. S. patent application Serial No. 377,563) has voltage and current coils diagrammatically indicated at $R^1$ and $R^2$ energized from the transformers $P^2$ $P^1$, and is arranged to operate its contacts $R^3$ $R^4$ $R^5$ instantaneously when the impedance or like ratio of the line falls below a predetermined value provided that the power flow is in a given direction. The voltage and current coils of the main protective relay S (such for example as that shown in Figure 10) are diagrammatically indicated at $S^1$ and $S^2$ and are energized from the transformers $P^2$ $P^1$ under the control of the contacts $R^4$ $R^3$ of the initiating relay R. A variable resistance T whose contact arm $T^1$ is driven by clockwork timing mechanism in the manner above described is connected in series with the voltage coil S¹, the clockwork timing mechanism being started up by an electromagnet T² energized from the d.c. source P⁵ under the control of the initiating relay contact R⁵. The contact S³ of the protective relay S controls the circuit of the circuit-breaker trip coil P⁴.

Thus on the occurrence of a fault on the line the initiating relay R operates its contacts R³ R⁴ R⁵, thus starting up the clockwork timing mechanism and connecting the relay coils S¹ S² in circuit. The resistance contact arm T¹ is thus driven at a definite timed rate to reduce the energization of the voltage coil S¹ until (if the fault has not already been cleared by another relay on the line) the relay operates its contact S³ and thus trips the circuit-breaker P³.

One convenient arrangement whereby the electromagnet T² starts up the clockwork timing mechanism is shown in Figure 12. The armature T³ of the electromagnet is pivoted at T⁴ and carries a spring strip T⁵ which normally makes frictional engagement with a brake disc U¹ carried by the escapement balance wheel U of the clockwork mechanism and thereby holds the mechanism inoperative. On energization of the electromagnet T² the armature pulls the spring strip T⁵ out of engagement with the disc U¹ and leaves the balance wheel U free to oscillate in the usual manner, deenergization of the electromagnet again applying the brake and stopping the mechanism.

As mentioned above in connection with Figure 2, it is often desirable to arrange that the slope of the time-distance curve should be reduced when the timing mechanism reaches a position ($k^1$ in Figure 2) corresponding to a fault position well beyond the end of the protected section. This may be effected in various ways, but Figure 13 shows by way of example one convenient method of effecting a change in the speed of movement of the fulcrum D for the arrangement of Figure 1. In this modification gearing capable of giving two speeds is interposed between a shaft V of the clockwork mechanism Q and the pinion W which drives the rack connected to the fulcrum D. This gearing consists of two mutilated gear wheels W¹, W² of different sizes carried by the shaft of the pinion W and respectively engaging with cooperating complete gear wheels V¹, V² on the shaft V. The teeth left on the mutilated gear wheels W¹ and W² are so arranged that the drive is transmitted through the gears V¹, W¹ during the early part of the movement but is transferred to the gears V², W² at the appropriate point, the sizes of the gear wheels being such as to give the desired two speeds of drive. Analogus arrangements may be employed with the alternative constructions of Figures 3–10, although it is simpler with the arrangements of Figures 7–10 to effect the same result by grading the resistance without altering the speed of movement of the contact arm.

The above arrangements have been described by way of example only and it will be understood that the invention may be carried into practice in other ways.

What we claim as our invention and desire to secure by Letters Patent is:—

1. In an electric protective relay of the kind in which the time of operation of the relay is dependent on the ratio of two operating currents, the combination of an electromagnetic contact-making device energized in accordance with the operating currents, a timing member, means whereby movement of the timing member from a normal position to a position dependent on the ratio of the two operating currents controls the electromagnetic device and thereby determines the time of operation of the relay, and timing mechanism for driving the timing member at a speed independent of the operating currents, the timing member being initially set at a position corresponding to a predetermined ratio value whereby when the ratio of the two operating currents is less than such predetermined value the relay operates substantially instantaneously without movement of the timing member from its initial position, while when the ratio of the two operating currents exceeds such predetermined value the timing member is driven from its initial position to determine the time of operation of the relay.

2. In an electric protective relay of the kind in which the time of operation of the relay is dependent on the ratio of two operating currents, the combination of a contact-making system, means for applying thereto at least one force derived from the operating currents, a timing member, means whereby movement of the timing member so controls the force applied to the contact-making system as to cause operation of the contacts when the member reaches a position dependent on the ratio of the two operating currents, and means independent of the operating currents for driving the timing member at a definite timed rate, the timing member being initially set at a position corresponding to a predetermined ratio value whereby when the ratio of the two operating currents is less than such predetermined value the relay operates substantially instantaneously without movement of the timing member from its initial position, while when the ratio of the two operating currents exceeds such predetermined value the timing member is driven from its initial position to determine the time of operation of the relay.

3. In an electric protective relay of the kind in which the time of operation of the relay is dependent on the ratio of two operating currents, the combination of a contact-making system, relay windings controlling the contact-making system and energized in accordance with the operating currents, a timing member, means whereby movement of the timing member varies the amount of resistance in circuit with one of the windings, and means independent of the operating currents for driving the timing member at a definite timed rate from a normal position to a position dependent on the ratio of the two operating currents, the timing member being initially set at a position corresponding to a predetermined ratio value and being driven from such position to determine the time of operation of the relay only when the ratio of the two operating currents exceeds such predetermined value.

4. In an electric protective relay of the kind in which the time of operation of the relay is dependent on the ratio of two operating currents, the combination of a contact-making system, means whereby the contact-making system is subjected to a single torque due to the interaction of at least two magnetic fluxes derived from the operating currents, a timing member, means whereby movement of the timing member from a normal position to a position dependent on the ratio of the two operating currents acts to vary the relationship between the torque exerted on the contact-making system and the operating currents and thereby determines the time of operation of the relay, and timing mechanism for driving the timing member at a speed independent of the operating currents.

5. In an electric protective relay of the kind in which the time of operation of the relay is dependent on the ratio of two operating currents, the combination of a contact-making system, relay windings so energized from the operating currents as to produce two magnetic fluxes whose interaction causes a single torque to be exerted on the contact-making system, a timing member, means whereby movement of the timing member controls the energization of one of the windings and thereby varies the relationship between one of the fluxes and the operating current from which it is derived, and means independent of the operating currents for driving the timing member at a definite timed rate whereby the movement of the timing member determines the time of operation of the relay.

6. In an electric protective relay of the kind in which the time of operation of the relay is dependent on the ratio of two operating currents, the combination of a contact-making system, means whereby the contact-making system is subjected to a single torque due to the interaction of at least two magnetic fluxes derived from the operating currents, a timing member, means whereby movement of the timing member from a normal position to a position dependent on the ratio of the two operating currents acts to vary the relationship between the torque exerted on the contact-making system and the operating currents and thereby determines the time of operation of the relay, and timing mechanism for driving the timing member at a speed independent of the operating currents, the timing member being initially set at a position corresponding to a predetermined ratio value and being driven from such position to determine the time of operation of the relay only when the ratio of the two operating currents exceeds such predetermined value.

7. In an electric protective relay of the kind in which the time of operation of the relay is dependent on the ratio of two operating currents, the combination of a contact-making system, relay windings so energized from the operating currents as to produce two magnetic fluxes whose interaction causes a single torque to be exerted on the contact-making system, a variable resistance in the energizing circuit of one of the windings, a timing member, means whereby movement of the timing member from a normal position to a position dependent on the ratio of the two operating currents varies the amount of resistance in such circuit and thereby determines the time of operation of the relay, and means independent of the operating currents for driving the timing member at a definite timed rate, the timing member being initially set at a position corresponding to a predetermined ratio value and being driven from such position to determine the time of operation of the relay only when the ratio of the two operating currents exceeds such predetermined value.

8. In an electric protective relay, the combination of a contact-making system, relay windings acting electromagnetically on the contact-making system and energized in accordance with the voltage and with the current in the protected line, a timing member, means whereby movement of the timing member from a normal position to a position dependent on the reactance ratio of the line determines the time of operation of the relay, and timing mechanism for driving the timing member at a speed independent of the voltage and current in the line, the timing member being initially set at a position corresponding to a predetermined ratio value whereby when the ratio of the two operating currents is less than such predetermined value the relay operates substantially instantaneously without movement of the timing member from its initial position, while when the ratio of the two operating currents exceeds such predetermined value the timing member is driven from its initial position to determine the time of operation of the relay.

9. In an electric protective relay, the combination of a contact-making system, two magnetic core members the fluxes in which interact to exert a torque on the contact-making system, two windings on one core member energized in accordance respectively with the voltage and with the current in the protected line, a single winding on the other core member energized in accordance with the current in the line, a timing member, means whereby movement of the timing member from a normal position to a position dependent on the reactance ratio of the line controls the energization of at least one of the windings and thereby determines the time of operation of the relay, and timing mechanism for driving the timing member at a speed independent of the voltage and current in the line.

10. In an electric protective relay, the combination of a contact-making system, relay windings so energized in accordance with the voltage and with the current in the protected line as to produce two magnetic fluxes whose interaction causes a single torque to be exerted on the contact-making system, a timing member, means whereby movement of the timing member controls the energization of at least one of the windings and thereby varies the relationship between one of the fluxes and the current from which it is derived, and means independent of the voltage and current in the line for driving the timing member at a definite timed rate whereby the time of operation of the relay is rendered dependent on the reactance ratio of the line, the timing member being initially set at a position corresponding to a predetermined ratio value and being driven from such position to determine the time of operation of the relay only when the reactance ratio of the line exceeds such predetermined value.

11. In an electric protective system for a sectionalized electric power line, the combination with each section, of a relay for protecting such section comprising an electromagnetic contact-making device energized in accordance with two operating currents dependent on the conditions in the protected line, a timing member, means whereby movement of the timing member from a normal position to a position dependent on the ratio of the two operating currents controls the electromagnetic device and thereby determines the time of operation of the relay, timing mechanism for driving the timing member at a speed independent of the operating currents, and means whereby for faults on the major portion of the protected section the relay operates substantially instantaneously without movement of the timing member, while for faults beyond such portion the relay operates after a time delay determined by the movement of the timing member and therefore dependent on the ratio of the two operating currents.

12. In an electric protective system for a sectionalized electric power line, the combination with each section, of a relay for protecting such section comprising a contact-making system, means whereby the contact-making system is subjected to a single torque due to the interaction of at least two magnetic fluxes derived from two operating currents dependent on the conditions in the protected line, a timing member, means whereby movement of the timing member from a normal position to a position dependent on the ratio of the two operating currents acts to vary the relationship between the torque exerted on the contact-making system and the operating currents and thereby determines the time of operation of the relay, timing mechanism for driving the timing member at a speed independent of the operating currents, and means whereby the relay operates substantially instantaneously for faults on the major portion of the protected section but after a time delay dependent on the ratio of the two operating currents for faults beyond such portion.

13. In an electric protective system for a sectionalized electric power line, the combination with each section, of a relay for protecting such section comprising a contact-making system, two magnetic core members the fluxes in which interact to exert a torque on the contact-making system, two windings on one core member energized in accordance respectively with the voltage and with the current in the protected line, a single winding on the other core member energized in accordance with the current in the line, a timing member, means whereby movement of the timing member from a normal position to a position dependent on the reactance ratio of the line controls the energization of at least one of the windings and thereby determines the time of operation of the relay, timing mechanism for driving the timing member at a speed independent of the operating currents, and means whereby the relay operates substantially instantaneously for faults on the major portion of the protected section but after a time delay dependent on the reactance ratio of the line for faults beyond such portion.

14. In an electric protective system for a sectionalized electric power line, the combination with each section, of a relay for protecting such section comprising an electromagnetic contact-making device energized in accordance with two operating currents dependent on the conditions in the protected line, a timing member, means whereby movement of the timing member from a normal position to a position dependent on the ratio of the two operating currents controls the electromagnetic device and thereby determines the time of operation of the relay, timing mechanism for driving the timing member at a speed independent of the operating currents, and means whereby for faults on the major portion of the protected section the relay operates substantially instantaneously without movement of the timing member, while for faults beyond such portion the relay operates after a time delay determined by the movement of the timing member and therefore dependent on the ratio of the two operating currents the arrangement of the protective relays being such that the time of operation of each relay for a fault at the remote end of the section has a predetermined value which is the same for all sections.

15. In an electric protective system for a sectionalized electric power line, the combination with each section, of a relay for protecting such section comprising an electromagnetic contact-making device energized in accordance with two operating currents dependent on the conditions in the protected line, a timing member, means whereby movement of the timing member from a normal position to a position dependent on the ratio of the two operating currents controls the electromagnetic device and thereby determines the time of operation of the relay, timing mechanism for driving the timing member at a speed independent of the operating currents, means whereby the relay operates substantially instantaneously for faults on the major portion of the protected section but after a time delay dependent on the ratio of the two operating currents for faults beyond such portion, and means whereby after the timing member has reached a predetermined position corresponding to a fault position beyond the end of the protected section, the operating time of the relay will increase at a relatively slow rate with respect to the operational ratio.

16. In an electric protective system for a sectionalized electric power line, the combination with each section, of a relay for protecting such section comprising a contact-making system, means whereby the contact-making system is subjected to a single torque due to the interaction of at least two magnetic fluxes derived from the voltage and the current in the protected line, a timing member, means whereby movement of the timing member from a normal position to a position dependent on the reactance ratio of the line acts to vary the relationship between the torque exerted on the contact-making system and the voltage and current in the line and thereby determines the time of operation of the relay, timing mechanism for driving the timing member at a speed independent of the voltage and current in the line, and means whereby the relay operates substantially instantaneously for faults on the major portion of the protected section but after a time delay dependent on the reactance ratio of the line for faults beyond such portion, the arrangement of the protective relays being such that the time of operation of each relay for a fault at the remote end of the section has a predetermined value which is the same for all sections.

17. In an electric protective relay of the kind in which the time of operation of the relay is dependent on the ratio of two operating currents, the combination with a contact-making system, of means energized from said currents to exert opposed forces on the contact-making system, one of said forces tending to operate said system while the other tends to restrain the system against operation, means movable to vary the relative effect of the two forces on the contact-making system, and timing mechanism for moving said last named means at a definite timed rate whereby the operating force overcomes the restraining force after a time-interval dependent on the ratio of the two operating currents.

18. In an electric protective relay of the kind in which the time of operation of the relay is dependent on the ratio of two operating currents, the combination with a contact-making system, of means energized from said currents to exert opposed forces on the contact-making system, one of said forces tending to operate said system while the other tends to restrain the system against operation, means movable to vary the relative effect of the two forces on the contact-making system, and timing mechanism for moving said last named means at a definite timed rate whereby the operating force overcomes the restraining force after a time-interval dependent on the ratio of the two operating currents, said last named means being so positioned initially that the contact-making system will be operated instantaneously without movement of said means when the ratio of the operating currents is less than a predetermined value.

19. In an electric protective relay of the kind in which the time of operation of the relay is dependent on the ratio of two operating currents, the combination with a contact-making system, of means energized from said currents to exert opposed forces on the contact-making system, one of said forces tending to operate said system while the other tends to restrain the system against operation, means movable to vary the relationship between at least one of the two forces and the operating currents, and timing mechanism for moving said last named means at a definite timed rate whereby the operating force overcomes the restraining force after a time-interval dependent on the ratio of the two operating currents.

20. In an electric protective relay of the kind in which the time of operation of the relay is dependent on the ratio of two operating currents, the combination with a contact-making system, of windings energized from said currents to exert opposed electromagnetic forces on the contact-making system, one of said forces tending to operate said system while the other tends to restrain the system against operation, means movable to vary the amount of resistance in circuit with one of the windings, and timing mechanism for moving said last named means at a definite timed rate whereby the operating force overcomes the restraining force after a time-interval dependent on the ratio of the two operating currents.

21. In an electric protective relay of the kind in which the time of operation of the relay is dependent on the ratio of two operating currents, the combination with a contact-making system, of means energized from said currents to exert opposed forces on the contact-making system, one of said forces tending to operate said system while the other tends to restrain the system against operation, means movable to vary the relationship between at least one of the two forces and the operating currents and timing mechanism for moving said last named means at a definite timed rate whereby the operating force overcomes the restraining force after a time-interval dependent on the ratio of the two operating currents, said last named means being so positioned initially that the contact-making system will be operated instantaneously without movement of said means when the ratio of the operating currents is less than a predetermined value.

22. In an electric protective relay of the kind in which the time of operation of the relay is dependent on the ratio of two operating currents, the combination with a contact-making system, of windings energized from said currents to exert opposed electromagnetic forces on the contact-making system, one of said forces tending to operate said system while the other tends to restrain the system against operation, means movable to vary the amount of resistance in circuit with one of the windings, and timing mechanism for moving said last named means at a definite timed rate whereby the operating force overcomes the restraining force after a time-interval dependent on the ratio of the two operating currents, said last named means being so positioned initially that the contact-making system will be operated instantaneously without movement of said means when the ratio of the operating currents is less than a predetermined value.

HENRY LEBEN.
NORMAN COOKE.